United States Patent
Nakajima

(10) Patent No.: US 6,225,361 B1
(45) Date of Patent: May 1, 2001

(54) EXPANDED HOLLOW MICRO SPHERE COMPOSITE BEADS AND METHOD FOR THEIR PRODUCTION

(75) Inventor: Takayuki Nakajima, Osaka (JP)

(73) Assignees: Akzo Nobel N.V., Arnhem (NL); Japan Fillite Co., Ltd., Osaka (JP)

(*) Notice: Subject to any disclaimer, the term of this patent is extended or adjusted under 35 U.S.C. 154(b) by 0 days.

(21) Appl. No.: 09/544,612

(22) Filed: Apr. 6, 2000

(30) Foreign Application Priority Data

Jul. 28, 1999 (JP) ................................................. 11-214341

(51) Int. Cl.⁷ ...................................................... C08J 9/224

(52) U.S. Cl. ........................... 521/57; 427/222; 427/224; 428/406; 428/407

(58) Field of Search .............................. 521/57; 427/222, 427/244; 428/406, 407

(56) References Cited

U.S. PATENT DOCUMENTS

| | | | |
|---|---|---|---|
| 4,722,943 | 2/1988 | Melber | 521/57 |
| 5,342,689 | 8/1994 | Melber | 428/402.22 |

*Primary Examiner*—Morton Foelak
(74) *Attorney, Agent, or Firm*—David J. Serbin

(57) ABSTRACT

The invention provides expanded hollow micro sphere composite beads and a process for producing the beads. According to the invention, finely divided calcium carbonate can be uniformly deposited on expanded hollow thermoplastic polymer micro spheres by a simple procedure without incurring breakage of the expanded micro spheres so that the scattering of beads can be effectively inhibited. The preferred production process comprises admixing expanded hollow thermoplastic polymer micro spheres (A), with colloidal calcium carbonate (B) which has been surface-activated with a surface-treating agent or dispersing agent, e.g. a fatty acid series or polymer acid series compound. The admixing can be typically effected by dry-blending, preferably at a temperature of about 50–100° C.

13 Claims, No Drawings

EXPANDED HOLLOW MICRO SPHERE COMPOSITE BEADS AND METHOD FOR THEIR PRODUCTION

TECHNICAL FIELD

The present invention relates to expanded hollow micro sphere composite beads with a reduced tendency to fly. The invention further relates to an industrially advantageous process for producing such expanded hollow micro sphere composite beads.

PRIOR ART

Expandable thermoplastic polymer beads are micro spheres each comprising a thermoplastic polymer shell and a blowing agent as entrapped therein. When such expandable beads are heated at a temperature high enough to induce a sufficient degree of expansion for a certain length of time, expanded thermoplastic polymer beads are obtained. For example, when expandable micro sphere beads measuring about 15 $\mu$m in diameter and having a true specific weight of about 1.3 Kg/l are expanded by heating, expanded micro spheres measuring about 60 $\mu$m and having a true specific weight of about 0.03 kg/l may be obtained. By formulating those expanded micro spheres in various paints, coating agents, molding compounds, putty, FRP, adhesives, sealants, water-proofing materials, etc. the weights of final products can be decreased.

However, because of the extremely low specific weight of such expanded micro spheres, the micro spheres are unavoidably sent flying and adrift in the air in handling to adversely affect the working environment. Therefore, there is a demand for technology by which the fly or scattering of expanded micro spheres might be inhibited.

One of the known measures for preventing flying involves wetting expanded beads with a liquid substance such as water. The flying of expanded beads can be effectively precluded by admixing about 1–20 weight parts of a liquid such as water with each weight part of the expanded beads. This is a time-honored practice. However, this wetting method cannot be applied, of course, when the substrate material with which the expanded beads are to be formulated abhors liquids such as water.

The other measure for preventing flying involves providing expanded beads which have been coated with a particulate inorganic substance. This countermeasure has the disadvantage of increasing the specific weight of expanded beads but is still capable of reducing the weight of the final product and, at the same time, preventing scattering of the expanded beads in handling.

Heretofore, the particulate material comprising expanded beads coated with an inorganic powder has been produced basically by the technology disclosed in U.S. Pat. No. 4,722,943.

Thus, U.S. Pat. No. 4,722,943 describes a process for producing free-flowing dry beads by drying expandable micro spheres in the form of a wet cake, which comprises a step of admixing a wet cake of expandable thermoplastic polymer micro spheres (unexpanded material) with a processing aid which is a free-flowing particulate of fibrous solid having a softening or melting temperature higher than that of said expandable micro spheres; a step of continuously drying wet cake under the temperature and time conditions sufficient to thoroughly remove the water from the cake to prepare free-flowing granules each having a deposition of coating layer of said processing aid on its surface; and, a step of recovering the free-flowing dry granules.

The processing aid mentioned above includes talc, calcium carbonate, barium sulfate, alumina, silica, titanium dioxide, zinc oxide, etc.; spherical or hollow beads of ceramics, quartz or glass; glass fiber, cotton flocs, carbon or graphite fiber; and mixtures thereof.

The process described in the above-mentioned US patent involves a treatment with said processing aid in the stage of expandable thermoplastic polymer micro spheres (unexpanded material) and while it might be suited to large-scale production of a few kinds of product items, the process has the disadvantage of comparatively high costs of production when applied to the production of many kinds of products in small quantities. Moreover, in this process a certain proportion of the processing aid not adherent to the expanded product remains unbound and that the exfoliation of the processing aid from the expanded product cannot be sufficiently precluded. In addition, because the process involves expansion of expandable micro spheres at a temperature beyond their melting temperature, there is encountered the trouble of the micro spheres being broken by the deposited processing aid during expansion or, if short of breakage, low-strength grains not resistant to destruction in the stage of incorporating them for weight-reducing purposes are formed inevitably in a certain proportion.

SUMMARY OF THE INVENTION

In view of the above state of the art, the object of the present invention is to provide expanded hollow micro sphere composite beads and a process for their production, characterized in that a finely divided calcium carbonate powder can be uniformly deposited on expanded hollow thermoplastic polymer micro spheres (expanded material) by a simple procedure substantially without causing rupture of the expanded micro spheres in the course and, hence, the scattering of the expanded beads during handling can be effectively prevented.

The expanded hollow micro sphere composite beads of the present invention are characterized by comprising a composite bead (D) which comprises and expanded hollow thermoplastic polymer micro sphere (A) and, as deposited thereon, colloidal calcium carbonate (B), preferably together with the surface-treating agent or dispersing agent (C). The particularly preferred composite bead (D) comprises and expanded hollow thermoplastic polymer micro sphere (A) and, as deposited on its surface, a colloidal calcium carbonate (B) which has been surface-activated with a surface-treating agent or dispersing agent in advance.

A process for producing an expanded hollow micro sphere composite bead according to the present invention comprises admixing expanded hollow thermoplastic polymer micro spheres (A) with colloidal calcium carbonate (B) and a surface-treating agent for dispersing agent (C) to provide composite beads (D) comprising expanded hollow thermoplastic polymer micro spheres (A) and, as deposited thereon, said colloidal calcium carbonate (B) together with said surface-treating agent or dispersing agent (C).

In another aspect a process for producing expanded hollow micro sphere composite beads according to the present invention comprises dry-blending expanded hollow thermoplastic polymer micro spheres (A) with finely-divided calcium carbonate (B') to provide composite beads each comprising said expanded hollow thermoplastic polymer micro sphere (A) and, as deposited on its surface, said calcium carbonate (B').

DETAILED DESCRIPTION OF PREFERRED EMBODIMENTS

The present invention is now described in detail. For brevity and avoidance of terminological confusion, the expanded hollow thermoplastic polymer micro sphere (A) will be referred to as expanded micro sphere (A) and the unexpanded thermoplastic polymer micro sphere (a) will be referred to as expandable micro sphere (a).

The expanded micro sphere (A) can be obtained by heating the expandable micro sphere (a) at a predetermined temperature. The expanded micro sphere (A) is a balloon-like artefact which can be imaged as a small rubber ball.

The expandable micro sphere (a) mentioned above is a thermally expandable micro sphere comprising a thermoplastic polymer shell and a blowing agent as entrapped therein. The preferred proportion of the blowing agent in the expandable micro sphere (a) may for example be about 5–30 weight %.

the thermoplastic polymer which can be used in the present invention includes polymers obtainable by polymerizing various monomers such as (meth)acrylonitrile, (meth) acrylates, styrenic monomers, vinyl hadiles, vinylidene halides, vinyl acetate, butadiene, vinylpyridine, chloroprene, etc; all of which may contain other comonomeric substances and crosslinking agents, such as divinylbenzene, ethylene glycol di(meth)acrylate, triethylene glycol di(meth)acrylate, trimethylolpropane tri(meth)acrylate, 1,3-butylene glycol di(meth)acrylate, allyl (meth)acrylate, triacrylformal, triallyl isocyanurate, etc. Among them, the homopolymers, copolymers or terpolymer of at least one monomer selected from among methyl methacrylate, acrylonitrile and vinylidene chloride are especially useful.

The blowing agent (foaming agent) for causing thermal expansion of the micro spheres have a boiling point not higher than the softening temperature of the thermoplastic polymer shell and includes n-pentane, isopentane, neopentane, butane, isobutane, hexane, isohexane, neohexane, heptane, isoheptane, octane and isooctane, or mixtures thereof, to mention just a few preferred examples. Aside from them, hydrocarbons such as petroleum ether, etc. and chlorinated hydrocarbons such as methyl chloride, methylene chloride, dichloroethane, dichloroethylene, trichloroethane, trichloroethylene, etc. can also be used.

The weight average particle diameter of expandable micro spheres is preferably about 1–100 $\mu$m. The true specific weight of the expandable micro spheres is preferably about 1.1–1.5 kg/l.

Heating the expandable micro sphere (a) at a predetermined temperature gives the expanded micro sphere (A). The heating can be effected by various methods such as air heating, steam heating, microwave heating, infrared or far-infrared heating, etc. The heating temperature depends on the grade of expandable micro sphere (a) used and cannot be generalized although a temperature within the range of about 100–250° C., particularly about 100–180° C., can be regarded as suitable in many instances.

The expandable micro spheres (a) mentioned above are commercially available and any of such commercial products can be utilized. The expanded micro spheres (A) are also commercially available and it is particularly preferable to use such commercial products. As to the latter micro spheres, there are Expancel® DE Series micro spheres.

Expanded micro spheres generally have a volume from about 30 to about 100 times the volume of the corresponding unexpanded micro spheres. The weigh average particle diameter of expanded micro spheres (A) is suitably about 5–300 $\mu$m, preferably about 10–200 $\mu$m, and most preferably about 30–120 $\mu$m, which values also apply for the composite beads of the invention. The true specific weight of expanded micro sphere (A) is preferably about 0.02–0.08 kg/l.

The colloidal calcium carbonate (B) is a calcium carbonate having an average primary particle diameter in the colloidal domain or region. The average primary particle diameter in this sense is suitably not more than about 0.2 $\mu$m, preferably not more than about 0.15 $\mu$m, most preferably not more than about 0.10 $\mu$m, and particularly most preferably not more than about 0.8 $\mu$m, as measured by a microscopic method. The lower limit is not critical but may, for example, be not less than about 0.01 $\mu$m, preferably not less than about 0.02 $\mu$m. Suitable colloidal calcium carbonate is commercially available as precipitated calcium carbonate (PCC).

The surface-treating agent or dispersing agent (C) includes fatty acid series compounds, polymer acid series compounds, sulfonic acid series compounds and unsaturated carboxylic acid-containing polymer compounds.

The fatty acid series compounds include but are not limited to saturated fatty acids such as caprylic acid, capric acid, lauric acid, myristic acid, pelmitic acid, stearic acid, arachic acid, behenic acid, montanic acid, etc. and their salts (alkall metal salts, ammonium salts, amine salts, etc.; the same applies hereinafter) or alkyl esters (alkyl moieties may be short-chain or long-chain or even residues of polyhydric alcohols; the same applies hereinafter); unsaturated fatty acids such as oleic acid, linoleic acid, linolenic acid, etc. and salts or alkyl esters of those unsaturated fatty acids; OH-containing fatty acids such as licinolic acid, 12-hydroxystearic acid, etc. and their salts or mono- or polyhydric alcohol esters; dibasic acids such as adipic acid, azelaic acid, sebacic acid, etc. and their salts or mono- or dialkyl esters; and oligo-esters and prepolymers of said compounds.

The polymer acid series compounds include but are not limited to alicyclic or aromatic acids and acid mixtures, mainly diterpene acids in tall oil or rosin, and their derivatives.

The sulfonic acid series compounds include but are not limited to methanesulfonic acid, benzenesulfonic acid, p-toluenesulfonic acid, naphthalenesulfonic acid, etc. and their derivatives.

The unsaturated carboxylic acid moiety of said unsaturated carboxylic acid-containing polymer compounds include but are not limited to ethylenically unsaturated mono- or dicarboxylic acids such as acrylic acid, methacrylic acid, crotonic acid, maleic acid, fumaric acid, etc., inclusive of half-esters of such dicarboxylic acids; and anhydrides of ethylenically unsaturated dicarboxylic acids such as maleic acid and crotonic acid. Those polymer compounds should contain an unsaturated carboxylic acid unit at least in a certain proportion (for example about 3–100 mol %). When they contain one or more co-monomer units in addition to the unsaturated carboxylic acid unit, the comonomer units may for example be various acrylates, methacrylates, hydroxyalkyl acrylates, hydroxyalkyl methacrylates, vinyl esters (e.g. vinyl acetate, vinyl propionate, vinyl versatate, etc.), vinyl ethers, vinyl halides (e.g. vinyl chloride), vinylidene halides (e.g. vinylidene chloride), styrenic monomers (e.g. styrene, vinyltoluene, etc.), nitrile monomers (e.g. acrylonitrile, methacrylonitrile, etc.), and amide monomers (e.g. acrylamide, methacrylamide, etc.). The polymer compounds may contain OH groups in addition to said unsaturated carboxylic acid unit.

The surface-treating agent or dispersing agent (C) is preferably used in the form of surface-activated colloidal calcium carbonate by depositing it on said colloidal calcium carbonate (B) in advance. The surface treatment may for example be effected by admixing the surface-treating or dispersing agent (C) with the slurry of colloidal calcium carbonate (B) prepared by the baking limestone and carbonaceous material for carbonation or admixing the surface-treating or dispersing agent (C) with a wet cake of colloidal calcium carbonate (B).

The expanded hollow micro sphere composite bead (composite bead (D)) according to the present invention has a structure such that said colloidal calcium carbonate (B) together with said surface-treating or dispersing agent (C) has been deposited on the surface of said expanded hollow micro sphere (expanded micro sphere) (A), preferably such that said colloidal calcium carbonate (B) which has been surface-activated with said surface-treating or dispersing agent (C) in advance has been deposited on the surface of said expanded hollow micro sphere (A).

The proportion of the expanded micro sphere (A) relative to 100 weight parts of the composite bead (D) is preferably about 3—30 weight parts, most preferably about 5–25 weight % and that of the colloidal calcium carbonate (B) on the same basis is preferably about 97–70 weight parts, most preferably 95–75 weight %. If the proportion of expanded micro sphere (A) is too small, the composite bead gains too much in specific weight so that the object of weight reduction may not be fully accomplished. If the proportion of expanded micro sphere (A) is too large, the specific weight of the composite bead will become too low so that the scattering trouble in handling may not be easily obviated.

The proportion of the surface-treating or dispersing agent (C) relative to 100 weight parts of colloidal calcium carbonate (B) is preferably about 0.01–10 weight parts, more preferably about 0.05–5 weight parts, and most preferably about 0.1–3 weight parts. If the proportion of the surface-treating or dispersing agent (C) is too small, the colloidal calcium carbonate (B) will not be sufficiently deposited on the expanded micro sphere (A). Conversly, if the proportion of the surface-treating or dispersing agent (C) is too large, the final product may be adversely affected and the cost of production be increases.

The true specific weight of composite bead (D) is dependent on the relative amount of (A) and (B) but is generally about 0.01–0.02 kg/l, particularly about 0.03–0.02 kg/l.

According to a first embodiment the expanded hollow micro sphere bead [composite bead (D)] is produced by admixing the expanded hollow thermoplastic polymer micro sphere (expanded micro sphere (A)) with the colloidal calcium carbonate (B) and preferably a surface-treating or dispersing agent (C). The most preferred process, however, comprises admixing said expanded hollow thermoplastic polymer micro sphere (expanded micro sphere (A)) with the colloidal calcium carbonate (B) surface-treated with said surface-treating or dispersing agent (C) in advance.

The admixing is preferably effected by dry-blending but can be carried out in the presence of a nominal or small amount of a liquid substance such as water. The admixing, dry-blending in particular, can be carried out by any suitable means known to those skilled in the art, for example by using a mixing machine equipped with a stirring means or simply shaking the component materials together in a vessel. In either case, a few seconds up to a few minutes of blending is normally sufficient.

The admixing, dry-blending in particular, can be carried out at ambient temperature (or even at reduced temperature) through about 50° C. but is preferably conducted at a temperature of about 50–100° C., more preferably about 55–95° C., most preferably about 60–90° C. In this temperature range, the thermoplastic polymer film constituting the shell of micro sphere (A) softens in a certain degree and the surface-treating or dispersing agent (C) also softens or melts.

According to a second embodiment, expanded hollow micro sphere bead can be produced by dry-blending said expanded micro sphere (A) with finely divided calcium carbonate (B') as well.

The finely divided calcium carbonate (B') mentioned above includes not only the colloidal calcium carbonate (B) mentioned hereinbefore but also light calcium carbonate and heavy calcium carbonate within the particle size range of about 1–10 μm or even not greater than about 1 μm.

The dry-blending in this second embodiment can also be carried out under the same conditions, inclusive of the technique and temperature, as those described above for first embodiment. Moreover, this dry-blending can also be carried out in the presence of a normal or small liquid substance such as water.

This process of the second embodiment is also useful because, despite being quite simple procedure-wise, the scattering of particles can be effectively prevented. However, compared with the process of the first embodiment, this process of the second embodiment may result in that a portion of finely divided calcium carbonate does not deposit on expanded micro spheres and that the exfoliation of the calcium carbonate particle from the micro spheres cannot be fully prevented. Therefore, the first embodiments is normally recommended.

EFFECTS OF INVENTION

The activated colloidal calcium carbonate (B) is a finely divided powder having an average primary particle diameter in the colloidal domain and, as such, tends to attach itself readily to expanded micro spheres (A). But when it is applied together with the surface-treating or dispersing agent (C) (particularly when the colloidal calcium carbonate (B) surface-treated with the surface treating or dispersing agent (C) is used), the deposition is still more facilitated. Moreover, when the blending is performed at a moderate temperature of about 50–100° C., the surface-treating or dispersing agent (C) (particularly the surface-treating of dispersing agent applied to the colloidal calcium carbonate (B) in advance) softens or melts to insure a better deposition of colloidal calcium carbonate (B) on expanded micro spheres (A) with the result that the exfoliation of colloidal calcium carbonate from the composite beads (D) and the scattering of the beads in handling are effectively inhibited.

Furthermore, since the treatment can be applied to the previously expanded micro spheres (A) at ambient temperature or at a temperature below the melting temperature, there is substantially no risk for destruction of the expanded micro spheres (A). Moreover, the method is suited for the production of many product items in small lots. In addition, the desired object can be accomplished by a simple admixing procedure so that the production process can be simplified to the extreme.

When a process of the second embodiment is employed, the effect achieved is not so prominent as compared with the first process but the required procedure is quite simple and, yet, the scattering of the beads can be effectively prevented. Therefore, this second embodiment is also industrially useful.

Accordingly, the present invention is very advantageous in both performance and practical utility.

INDUSTRIAL APPLICABILITY

The expanded hollow micro sphere composite bead [composite bead (D)] according to the present invention can be formulated in to various paints, coatings, molding materials, putty, FRP, adhesives, sealants, caulking materials, water-proofing agents and other compositions with great advantage. In such applications, the composite bead of the invention contributes to weight reduction, cushioning properties, heat insulation, warmth retention, dimensional stability and other functional qualities.

EXAMPLES

The following examples are further illustrative of the present invention. In the description that follows, all "parts" and percentages are by weight, unless otherwise is stated.

As samples of the expandable thermoplastic polymer micro sphere (expandable micro sphere) (a), the following two kinds of micro spheres were used.

(a-1): True-round thermally expandable micro spheres comprising a methyl methacrylate-acrylonitrile copolymer shell and, as entrapped therein, a hydrocarbon series (isobutane) blowing agent, which had a weigh average particle diameter of about 15 µm, and a true specific weight of about 1.1 kg/l, an expansion start temperature of 90–115° C. and a maximum expansion temperature of about 140° C.

(a-2): True-round thermally expandable micro spheres comprising a methyl methacrylate-acrylonitrile-methacrylonitrile copolymer shell and, as entrapped therein, a hydrocarbon series (isopentane) blowing agent, which has a weight average particle diameter of about 10–40 µm, a true specific weight of about 1.2 kg/l, and expansion start temperature of about 120° C. and a maximum expansion temperature of about 90° C.

The above expandable micro spheres (a-1) and (a-2) were caused to expand at about 140 C. and about 190 C., respectively, to provide the following two kinds of expanded micro spheres. However, since those expanded micro spheres were commercially available, the commercial products were used in the experiment.

(A-1): Expanded hollow thermoplastic polymer micro spheres having a weight average particle diameter of about 40 µm and a true specific weight of about 0.06 kg/l (expanded micro spheres).

(A-2): Expanded hollow thermoplastic polymer micro spheres having a weight average particle diameter of about 100 µm and a true specific weight of about 0.02 kg/l (expanded micro spheres).

The following tow kinds of colloidal calcuim carbonates (B) each surface-activated with a surface-treating or dispersing agent (C) were prepared.

(B-1): Colloidal light calcium carbonate having an average primary particle diameter of 0.07 µm, which is within the colloidal region, the surface of which had been activated with a small amount of fatty acid series surface-treating agent (specific surface area 4.5 m²/g, BET specific surface area 20 m²/g, bulk density 350 ml/100 g).

(B-2): Colloidal light calcium carbonate having an average primary particle diameter of 0.07 µm, which is within the colloidal region, the surface of which had been activated with a small amount of a polymer acid-sulfonic acid series surface-treating agent (specific surface area 4.5 m²/g, BET specific surface area 20 m²/g, bulk density 270 ml/100 g).

As calcium carbonate (B'), the following heavy calcium carbonate was prepared.

(B'-1): Heavy calcium carbonate having an average primary particle diameter of 1.08 µm, a specific surface area of 2.2 m²/g and a bulk density of 280 ml/100 g.

EXAMPLES 1–6

Fifteen (15) parts of the above expanded micro spheres (A-1) or (A-2) and 85 parts of the above surface-activated colloidal calcium carbonate (B-1) or (B-2) were either held at ambient temperature or preheated in the air about 70° C. and put in a bag. The bag was shaken for about 2–3 minutes for dry-blending to provide composite beads (D). The combinations, temperatures and results are shown below in Table 1.

EXAMPLES 7–8

Fifteen (15) parts of the above expanded micro spheres (A-1) and 85 parts of the above heavy calcium carbonate (B') were either held at ambient temperature or heated in the air about 70° C. In advance and put in a bag. The bag was shaken for 2–3 minutes for dry-blending to provide composite beads (D'). The conditions a and results are also shown in Table 1.

The composite beads (D) or (D') obtained in the above examples were respectively placed in a transparent cylindrical plastic container (about 65 mm in. dia.×about 95 mm in. height) up to the level of about ⅓ from the top. The filled container was quickly inverted upside down and the head space clearing time was measured (initial clearance time). This inverting procedure was repeated 20 times and the clearance time in the $20^{th}$ session was also measured.

The composite beads (D) and (D') after the initial session and the $20^{th}$ session of the above inversion test were observed under the microscope at ×100, ×200 and ×500 magnifications. It was examined whether the calcium carbonate had been well deposited on the surface of expanded micro spheres and whether there were residues of non-deposited calcium carbonate and the findings were evaluated according to the 4-grade rating schedule:

TABLE 1

| | | | | Inversion test | | Microscopic findings | |
|---|---|---|---|---|---|---|---|
| | Blending | Combination | | | After | | After |
| | tempera-ture | (A) | (B), (B') | Initial | 20th session | Initial | 20th session |
| Example 1 | 70° C. | (A-1) | (B-1) | 4 sec | 4 sec | ⊚ | ⊚ |
| Example 2 | 70° C. | (A-2) | (B-1) | 4 sec | 4 sec | ⊚ | ⊚ |
| Example 3 | 70° C. | (A-1) | (B-2) | 4 sec | 4 sec | ⊚ | ⊚ |
| Example 4 | 70° C. | (A-2) | (B-2) | 4 sec | 4 sec | ⊚ | ⊚ |
| Example 5 | Amb. temp. | (A-1) | (B-1) | 6 sec | 6 sec | ○ | ○ |
| Example 6 | Amb. temp. | (A-2) | (B-2) | 6 sec | 6 sec | ○ | ○ |
| Example 7 | 70° C. | (A-1) | (B'-1) | 8 sec | 8 sec | ○–□ | ○–□ |
| Example 8 | Amb. temp. | (A-1) | (B'-1) | 8 sec | 8 sec | ○–□ | ○–□ |

⊚very satisfactory,
○satisfactory,
□fairly satisfactory, and
△rather poor.

It can be seen from Table 1 that, in Examples 1–8, the surface-activated colloidal calcium carbonate (B) was well deposited on expanded micro spheres (A), that, in this respect, the products of Example 1–4, where the blending was performed at 70° C., were superior to the products of Examples 5 and 6, where the blending was performed at ambient temperature, and, therefore, that the scattering of composite beads (D) in handling could be effectively inhibited. The beads obtained in Examples 7 and 8 were somewhat inferior to the beads obtained in Examples 1–8 but since the admixing procedure was quite simple as it was the case in Examples 1–6, those beads are industrially more acceptable.

COMPARATIVE EXAMPLE 1

Fifteen (15) parts of the same expandable micro spheres (a-1) as used in Example 1 and 85 parts of said heavy calcium carbonate (B'-1) were blended and heated to 150° C. for expansion to provide expanded micro spheres carrying a deposit of (B'-1). However, the resulting beads were disadvantageous in that the effect achieved was only comparable to the effect obtained in Examples 7 and 8, that it required critical control to expand the expandable micro spheres (a-1) to a suitable degree of expansion in the presence of a large amount of heavy calcium carbonate (B'-1), that when the heating time was prolonged to achieve the necessary degree of expansion, a certain proportion of the beads underwent breakage or, if short of breakage, some of the beads were too fragile to withstand breakage in admixing with the substrate for weight reduction.

REFERENCE EXAMPLE 1

Fifteen (15) parts of the same expandable micro spheres (a-1) as used in Example 1 and 85 parts of said surface-activated colloidal calcium carbonate (B-1) were blended and heated to 140° C. for expansion to provide expanded beads carrying a deposit of (B-1). The expanded beads were almost as good as the beads obtained in Example 5 and 6 but when the heating time was prolonged to achieve the necessary degree of expansion, a certain proportion of beads underwent breakage or, if short of breakage, some of the beads were too fragile to withstand breakage in admixing with the substrate for weight reduction.

What is claimed is:

1. A process for producing expanded hollow micro sphere composite beads which comprise admixing an expanded hollow thermoplastic polymer micro spheres with colloidal calcium carbonate to provide composite beads having a hollow expanded thermoplastic polymer micro sphere shell and, as deposited on its surface, colloidal calcium carbonate.

2. A process as claimed in claim 1, wherein also a surface-treating of dispersing agent is admixing with said expanded hollow thermoplastic polymer micro spheres and said colloidal calcium carbonate.

3. A process as claimed in claim 2, wherein said colloidal calcium carbonate has been surface-activated with said surface-treating of dispersing agent in advance to the admixing with said hollow thermoplastic polymer micro spheres.

4. A process as claimed in claim 1, wherein the admixing is effected by dry blending.

5. A process as claimed in claim 4, wherein the dry blending is performed at about 50–100° C.

6. A process for producing expanded hollow micro sphere composite beads which comprises admixing an expanded hollow thermoplastic polymer micro spheres with finely divided calcium carbonate particles to provide composite beads having a hollow expanded thermoplastic polymer micro sphere shell and, as deposited on its surface, said finely divided calcium carbonate particles.

7. Expanded hollow micro sphere composite beads, said beads comprising a hollow expanded thermoplastic polymer micro sphere shell and, as deposited on its surface, a colloidal calcium carbonate and a surface treating agent selected from the group consisting of at least one of a fatty acid series compound, a polymer acid series compound, a sulfonic acid series compound, and an unsaturated carboxylic acid-containing polymer compound.

8. Expanded hollow micro sphere composite beads as claimed in claim 7, wherein said colloidal calcium carbonate deposited on the surface of said expanded hollow thermoplastic polymer micro sphere shell has been surface-activated with said surface-treating agent.

9. Expanded hollow micro sphere composite beads as claimed in claim 7, wherein said colloidal calcium, carbonate has a colloidal domain particle size of not more that about 0.02 $\mu$m in terms of average primary particle diameter.

10. Expanded hollow micro sphere composite beads as claimed in claim 7, wherein the weight average particle diameter is about 5–300 $\mu$m.

11. Expanded hollow micro sphere composite beads as claimed in claim 7, wherein, based on 100 weight parts of the composite beads, the expanded hollow thermoplastic polymer micro sphere occurs in a proportion of about 3–30 weight parts and the colloidal calcium carbonate in a proportion of about 97-70 weight parts, and based on 100 weight parts of the colloidal calcium carbonate, the surface-treating agent occurs in a proportion of about 0.01–10 weight parts.

12. A process for producing expanded hollow micro sphere composite beads which comprises admixing expanded hollow thermoplastic polymer micro spheres with colloidal calcium carbonate to provide composite beads each having a hollow expanded thermoplastic polymer micro sphere shell, and deposited on its surface, colloidal calcium carbonate, wherein the colloidal calcium carbonate contains calcium carbonate particles surface from the group consisting of at least one of a fatty acid series compound, and an unsaturated carboxylic acid-containing polymer compound.

13. A process for producing expanded hollow micro sphere composite beads which comprises admixing expanded hollow thermoplastic polymer micro spheres with finely divided calcium carbonate particles to provide composite beads each having a hollow expanded thermoplastic polymer micro sphere shell, and deposited on its surface, colloidal calcium carbonate wherein the finely divided calcium carbonate particles surface activated in advance with a surface treating agent selected from the group consisting of a fatty acid series compound, a polymer acid series compound, a sulfonic acid series compound, or unsaturated carboxylic acid-containing polymer compound and combinations thereof.

* * * * *

UNITED STATES PATENT AND TRADEMARK OFFICE
CERTIFICATE OF CORRECTION

PATENT NO. : 6,225,361 B1
DATED : May 1, 2001
INVENTOR(S) : Takayuki Nakajima

It is certified that error appears in the above-identified patent and that said Letters Patent is hereby corrected as shown below:

<u>Title page,</u>
Item [56], References Cited, U.S. PATENT DOCUMENTS, add:
-- 4,110,267    8/1978      Ikeda         521/57
   4,888,241    12/1989     Melber        428/407
   5,124,365    6/1992      Rappold       521/57 --
After last U.S. PATENT DOCUMENT cited add:
-- FOREIGN PATENT DOCUMENTS
   0733672     9/1996       (EP)
   57-063335   4/1982       (JP)
   58-057454   12/1983      (JP) --

Signed and Sealed this

Nineteenth Day of August, 2003

JAMES E. ROGAN
*Director of the United States Patent and Trademark Office*